US010557053B2

(12) United States Patent
Reisacher et al.

(10) Patent No.: US 10,557,053 B2
(45) Date of Patent: Feb. 11, 2020

(54) UNIVERSAL PIGMENT PREPARATIONS FOR POINT-OF-SALE USE

(71) Applicant: BASF SE, Ludwigshafen (DE)

(72) Inventors: Hansulrich Reisacher, Maxdorf (DE); Uwe Mauthe, Mannheim (DE); Steffen Onclin, Neustadt (DE)

(73) Assignee: BASF SE, Ludwigshafen (DE)

( * ) Notice: Subject to any disclaimer, the term of this patent is extended or adjusted under 35 U.S.C. 154(b) by 68 days.

(21) Appl. No.: 15/749,669

(22) PCT Filed: Aug. 16, 2016

(86) PCT No.: PCT/EP2016/069433
§ 371 (c)(1),
(2) Date: Feb. 1, 2018

(87) PCT Pub. No.: WO2017/029291
PCT Pub. Date: Feb. 23, 2017

(65) Prior Publication Data
US 2018/0223121 A1 Aug. 9, 2018

(30) Foreign Application Priority Data
Aug. 20, 2015 (EP) .................................. 15181696

(51) Int. Cl.
| | | |
|---|---|---|
| *C09D 17/00* | (2006.01) | |
| *C09B 67/04* | (2006.01) | |
| *C09B 67/00* | (2006.01) | |
| *C09B 67/46* | (2006.01) | |
| *C09C 1/24* | (2006.01) | |
| *C09C 1/56* | (2006.01) | |

(52) U.S. Cl.
CPC ........ *C09D 17/007* (2013.01); *C09B 67/0002* (2013.01); *C09B 67/009* (2013.01); *C09B 67/0022* (2013.01); *C09B 67/0086* (2013.01); *C09B 67/0089* (2013.01); *C09C 1/24* (2013.01); *C09C 1/56* (2013.01); *C01P 2004/61* (2013.01); *C01P 2004/62* (2013.01)

(58) Field of Classification Search
CPC .............. C09D 17/007; C09B 67/0002; C09B 67/0022; C09B 67/0086; C09B 67/0089; C09B 67/009; C09C 1/24; C09C 1/56; C01P 2004/61; C01P 2004/62
See application file for complete search history.

(56) References Cited

U.S. PATENT DOCUMENTS

| | | |
|---|---|---|
| 5,340,394 A | 8/1994 | Elsamanoudi |
| 2006/0207476 A1 | 9/2006 | Coward et al. |
| 2007/0199477 A1 | 8/2007 | Hill et al. |
| 2008/0190319 A1 | 8/2008 | Reisacher et al. |
| 2008/0293851 A1 | 11/2008 | Espino et al. |
| 2010/0113685 A1 | 5/2010 | Coward et al. |
| 2011/0244385 A1 | 10/2011 | Fechner et al. |
| 2012/0316273 A1 | 12/2012 | Korenkiewicz et al. |
| 2015/0274977 A1 | 10/2015 | Reisacher et al. |
| 2018/0244925 A1* | 8/2018 | Reisacher ............ C09D 17/007 |
| 2019/0031904 A1* | 1/2019 | Reisacher ............ C09D 17/001 |

FOREIGN PATENT DOCUMENTS

| | | |
|---|---|---|
| DE | 10 2005 020 742 A1 | 3/2006 |
| DE | 10 2005 035 253 A1 | 2/2007 |
| DE | 10 2007 021 867 A1 | 11/2008 |
| EP | 1 757 664 A2 | 2/2007 |
| WO | WO 2004/046251 A2 | 6/2004 |
| WO | WO 2010/057864 A2 | 5/2010 |
| WO | WO 2011/151277 A1 | 12/2011 |
| WO | WO 2014/000842 A1 | 1/2014 |

OTHER PUBLICATIONS

International Search Report dated Oct. 31, 2016 in PCT/EP2016/069433, 4 pages.
European Search Report dated Feb. 29, 2016 in European Patent Application No. 15 18 1696, 3 pages.
González-Gómez, J., "Zugeben, einrühren—fertig ist der Lack", Vincentz Network Farbe & Lack, XP055257320, Apr. 1, 2005, pp. 158-168.

* cited by examiner

*Primary Examiner* — Anthony J Green
(74) *Attorney, Agent, or Firm* — Oblon, McClelland, Maier & Neustadt, L.L.P.

(57) ABSTRACT

Subject matter are aqueous, low-VOC/SVOC universal pigment preparations comprising a pigment component, a water-soluble, anionic, surface-active additive from the group of the homo- and copolymers of ethylenically unsaturated monocarboxylic or dicarboxylic acids, which may further comprise, in copolymerized form, vinyl monomers containing no acid function, and of the salts of these homo- and copolymers, the homo- and copolymers being at least partly esterified with a polyether alcohol or a derivative thereof, and comprising a phosphoric or phosphonic ester, and optionally customary additives. The aqueous pigment preparations are suitable for the coloring of inks, paints, and renders, especially in metering systems at the point of sale or in in-plant tinting systems.

14 Claims, No Drawings of paints, inks or renders, preferably in metering systems at
UNIVERSAL PIGMENT PREPARATIONS FOR POINT-OF-SALE USE The present invention relates to aqueous pigment preparations, the production thereof, and their use for the coloring of paints, inks or renders, preferably in metering systems at the point of sale (POS) or in in-plant tinting systems.

BACKGROUND OF THE INVENTION

Liquid systems, such as coating materials, varnishes, emulsion paints, and printing inks, are customarily pigmented using pigment preparations which comprise water, organic solvent or combinations thereof. In addition to anionic, cationic, nonionic or amphoteric dispersants, these pigment preparations must generally be admixed with further auxiliaries, such as humectants, agents for increasing the freeze resistance, thickeners for stabilization, biocides, and defoamers.

Such pigment preparations are employed as tinting pastes in retail stores and professional decorating businesses, and, using metering and tinting systems, are added to aqueous and solventborne inks and paints in order to set customer-specific shades. For the precise setting of a particular shade, the tinting pastes are generally metered volumetrically.

In order to comply with the guidelines for awarding of various eco labels, inks and paints have for some time advantageously been given low-VOC (volatile organic compounds) or VOC-free formulations. The same standards are also desired for the pigment preparations which are mixed in at the point of sale to the low-VOC or VOC-free inks and paints.

U.S. Pat. No. 5,340,394 teaches VOC-free pigment concentrates based on linear polyethylene glycol polyethers with molecular weights of 190 to 700 and nonionic alkyl glycosides for use at the point of sale. The pigment concentrates are described as being especially suitable for latex paints and alkyd paints, and additionally these pigment concentrates are said to be blocking-resistant.

US-A-2006/0207476 and US-A-2010/0113685 describe low-VOC universal pigment pastes which are stable, which have favorable rheology, and which are suitable for aqueous emulsion paints and for solventborne alkyd paints. The pastes may be provided in closed containers which allow simple metering in controlled quantities. These pastes contain not only solvent-compatible surfactants but also latex-compatible surfactants, such as alkyl polyethylene glycol ethers, secondary alcohol ethoxylates, difunctional propylene oxide/ethylene oxide block polymers (with secondary OH groups), ethylene oxide/propylene oxide block copolymers, alkylaryl polyglycol ethers, or amine salts of hydrophilic copolymers of polycarboxylic acids.

WO-A-2014/000842 teaches aqueous universal pigment preparations based on fatty acid condensation products and nonionic surfactants. The pigment preparations are described as being stable in their viscosity, foam, and sedimentation behavior after storage at 60° C. for one week.

WO-A-2011/151277 teaches low-VOC aqueous universal pigment preparations which are described as being suitable for preventing the drying of the preparations in open nozzles of the paint-mixing systems, and also for producing coatings of certain hardness. The pigment preparations comprise stabilizers, examples being ethoxylated fatty acid monoethanolamides, anionic surfactants based on tristyrylphenol-polyglycol ether phosphate esters, or phospholipid-based surfactants, rheological additives based on clay minerals, and also nonvolatile, organic solvents such as polyethylene glycols PEG 200 or PEG 400.

US-A-2012/0316273 describes a point-of-sale system for aqueous emulsion paints that is composed of a plurality of liquid pigment preparations which are described as being suitable for preventing the drying of the preparations in open nozzles of the metering systems. The pigment preparations comprise a polyalkylene glycol as humectant, an ethoxylated surfactant, and filler.

DE-A-102007021867 describes an aqueous pigment preparation which comprises as dispersant an anionic copolymer produced by means of a macromonomer composed of polyethylene/polypropylene glycol mono(meth)acrylic esters, where the polyalkylene glycol group contains a terminal acid group. Also present are organic solvents, such as ethylene glycol or propylene glycol.

Despite the proposals in the prior art of a multiplicity of compounds as additives for universal pigment preparations, there continues to be a need for effective additive combinations for such pigment preparations, satisfying the requirements of precise volumetric metering and at the same time the desired color properties.

Moreover, environmentally objectionable substances and also sensitizing substances ought largely to be avoided.

European directives and laws are requiring not only ever-lower VOC contents of less than 1000 ppm but also low SVOC contents (i.e., low levels of semivolatile organic compounds). Analytically, the VOC contents and SVOC contents are determined by means of GC-MS in accordance with DIN ISO 11890-2 (in-can measurement in ppm).

This therefore necessitates an entirely new assessment of the additives, since many additives undergo decomposition under the ISO 11890-2 conditions, starting at about 200° C. to 367° C. (387° C.: boiling point of $C_{22}H_{46}$ (n-docosane)), and therefore simulate a VOC and/or SVOC content.

Further requirements of European directives and laws call for the absence of additives which have an environmental hazard potential in accordance with the CLP Regulation (EC) No. 1272/2008 concerning the Classification, Labeling and Packaging of substances and mixtures. Additives with H400 hazard statements are approved only with very great restrictions for use in paints. Alkylphenyl ethoxylates (APEOs) are likewise no longer approved in EU Directive 2003/53/EC.

Furthermore, the use of the customary surfactants based on fatty alcohol alkoxylates with less than 20 alkylene oxide units, or on amino compounds, is restricted. Surfactants with H318 classification can no longer be used in the quantities needed.

Moreover, compounds having H317 classification, which may give rise to allergic skin reactions, can be used only at a maximum of 0.1 wt %.

It was an object of the present invention, therefore, to provide stable universal pigment preparations which are distinguished by ultimately advantageous performance properties, especially high color strength or easy dispersibility (capacity for stirred incorporation) in a very wide variety of application media, and/or which, over a prolonged period, exhibit no drying either in the containers or in the metering system, especially in nozzles. The pigment preparations ought also to exhibit no rubout, in the context of the coloring of the various emulsion paints and coatings.

A further object of the invention was to provide aqueous universal pigment preparations which pose a low environmental hazard, in other words preparations which are low in VOC and low in SVOC and which also contain largely no environmentally objectionable substances and sensitizing substances, in other words containing no substances liable for labeling in accordance with various eco labels, as for example in accordance with the CLP Regulation (EC) No. 1272/2008.

SUMMARY OF THE INVENTION

It has now been found that pigment preparations which comprise a combination of a homo- and copolymer esterified with a polyether alcohol, and an additive based on a phosphoric or phosphonic ester, and having the desired properties, can be obtained.

The present invention accordingly provides a pigment preparation comprising, based in each case on the total weight of the preparation,
(A) 1 to 80 wt % of a pigment component which comprises a pigment and optionally a filler;
(B) 0.01 to 10 wt % of a water-soluble, anionic, surface-active additive from the group of the homo- and copolymers of ethylenically unsaturated monocarboxylic acids and/or ethylenically unsaturated dicarboxylic acids, which may further comprise, in copolymerized form, vinyl monomers containing no acid function, and of the salts of these homo- and copolymers, the homo- and copolymers being at least partly, preferably at least 30 mol %, esterified with a polyether alcohol or a derivative thereof;
(C) 0.01 to 8 wt % of a phosphoric ester and/or phosphonic ester;
(D) 0 to 20 wt % of further additives customary for aqueous pigment preparations; and
(E) water,
where the sum of the percentages by weight of components (A) to (E) makes 100 wt %.

Further provided is a method for producing a pigment preparation of the invention, where first of all components (A) to (C) and at least part of component (D) are introduced into water, the resulting suspension is subjected to wet comminution, and optionally the remaining amount of component (D) is subsequently added to the suspension.

A further subject of the present invention relates to the use of the pigment preparation of the invention for coloring paints, inks, and renders, preferably in metering systems at the point of sale or in in-plant tinting systems.

DETAILED DESCRIPTION OF THE INVENTION

The term "low-VOC" denotes a concentration of the volatile organic compounds as per DIN ISO 11890-2 of less than 1000 ppm.

The term "low-SVOC" denotes a concentration of the semivolatile organic compounds as per DIN ISO 11890-2 of less than 5000 ppm.

The term "(meth)acryl . . . " encompasses acryl . . . and/or methacryl . . . .

The terms "a/an", "the", "at least one", and "one or more" are used interchangeably; in other words, a pigment component comprising "a" pigment also encompasses a pigment component comprising "one or more pigments".

Essential constituents of the pigment preparations of the invention are the pigment component (A), a water-soluble, anionic, surface-active additive (B), a phosphoric ester and/or phosphonic ester (C), and water. Present optionally are further additives (D) customary for the production of aqueous pigment preparations, examples being humectants, rheological additives like thickeners, further dispersants, for example nonionic additives based on polyethers, and defoamers, foam suppressants, stabilizers, such as biocides or fungicides, antiflocculants, buffer substances, pH regulators, and pigment synergists. Components (D) are different from components (B) and (C). All of the constituents add up to 100 wt % of the pigment preparation.

As component (A), organic or inorganic pigments may be present in the pigment preparations of the invention. The pigment preparations may of course also comprise combinations of different organic or different inorganic pigments, or combinations of organic and inorganic pigments. The same applies to fillers and combinations of pigment(s) and filler(s).

Component (A) preferably comprises at least one pigment and at least one filler.

The pigments and fillers are customarily in finely divided form. The pigments accordingly generally have an average particle size of 0.1 to 5 µm. The particle size may be determined in accordance with DIN 13320.

The organic pigments are customarily organic chromatic and black pigments. Inorganic pigments may likewise be color pigments (chromatic, black and white pigments) and also luster pigments, and the inorganic pigments used customarily as fillers.

Organic pigments may be selected from the class of the monoazo pigments, disazo pigments, disazo condensation pigments, anthanthrone pigments, anthraquinone pigments, anthrapyrimidine pigments, quinacridone pigments, quinophthalone pigments, diketopyrrolopyrrole pigments, dithioketopyrrolopyrrole pigments, dioxazine pigments, flavanthrone pigments, indanthrone pigments, isoindoline pigments, isoindolinone pigments, isoviolanthrone pigments, metal complex pigments, perinone pigments, perylene pigments, phthalocyanine pigments, pyranthrone pigments, pyrazoloquinazolone pigments, indigo pigments, thioindigo pigments, triarylcarbonium pigments, and combinations thereof.

The following examples of suitable organic color pigments are given below:
Monoazo pigments: C.I. Pigment Yellow 1, 3, 62, 65, 73, 74, 97, 183 and 191; C.I. Pigment Orange 5, 38, and 64; C.I. Pigment Red 1, 2, 3, 4, 5, 23, 48:1, 48:2, 48:3, 48:4, 49, 49:1, 51, 51:1, 52:1, 52:2, 53, 53:1, 53:3, 57:1, 58:2, 58:4, 63, 112, 146, 148, 170, 184, 187, 191:1, 210, 245, 247, and 251;
Disazo pigments: C.I. Pigment Yellow 12, 13, 14, 16, 17, 81, 83, 106, 113, 126, 127, 155, 170, 174, 176, and 188; C.I. Pigment Orange 16, 34, and 44;
Disazo condensation pigments: C.I. Pigment Yellow 93, 95, and 128; C.I. Pigment Red 144, 166, 214, 220, 221, 242, and 262; C.I. Pigment Brown 23, and 41;
Anthanthrone pigments: C.I. Pigment Red 168;
Anthraquinone pigments: C.I. Pigment Yellow 147 and 199; C.I. Pigment Red 177;
Anthrapyrimidine pigments: C.I. Pigment Yellow 108;
Benzimidazolone pigments: C.I. Pigment Yellow 120, 151, 154, 180, 181; C.I. Pigment Orange 36, and 72, C.I. Pigment Red 175, 185, 208; C.I. Pigment Brown 25; C.I. Pigment Violet 32;
Quinacridone pigments: C.I. Pigment Orange 48 and 49; C.I. Pigment Red 122, 202, 206, and 209; C.I. Pigment Violet 19;
Quinophthalone pigments: C.I. Pigment Yellow 138;
Diketopyrrolopyrrole pigments: C.I. Pigment Orange 71, 73, and 81; C.I. Pigment Red 254, 255, 264, 270, and 272;
Dioxazine pigments: C.I. Pigment Violet 23;

Flavanthrone pigments: C.I. Pigment Yellow 24;
Indanthrone pigments: C.I. Pigment Blue 60 and 64;
Isoindoline pigments: C.I. Pigment Yellow 139 and 185; C.I. Pigment Orange 61 and 69, C.I. Pigment Red 260;
Isoindolinone pigments: C.I. Pigment Yellow 109, 110, and 173;
Isoviolanthrone pigments: C.I. Pigment Violet 31;
Metal complex pigments: C.I. Pigment Red 257; C.I. Pigment Yellow 117, 129, 150, 153, and 177; C.I. Pigment Green 8;
Perinone pigments: C.I. Pigment Orange 43; C.I. Pigment Red 194;
Perylene pigments: C.I. Pigment Red 123, 149, 178, 179, and 224; C.I. Pigment Violet 29; C.I. Pigment Black 31 and 32;
Phthalocyanine pigments: C.I. Pigment Blue 15, 15:1, 15:2, 15:3, 15:4, 15:6, 16; C.I. Pigment Green 7, 36;
Pyranthrone pigments: C.I. Pigment Orange 51; C.I. Pigment Red 216;
Pyrazoloquinazolone pigments: C.I. Pigment Orange 67 and C.I. Pigment Red 216;
Thioindigo pigments: C.I. Pigment Red 88 and 181; C.I. Pigment Violet 38;
Triarylcarbonium pigments: C.I. Pigment Red 81, 81:1, and 169; C.I. Pigment Violet 1, 2, 3, and 27; C.I. Pigment Blue 1, 61, and 62; C.I. Pigment Green 1;
C.I. Pigment Black 1 (aniline black);
C.I. Pigment Yellow 101 (aldazine yellow);
C.I. Pigment Brown 22.

Examples of suitable inorganic color pigments are as follows:
white pigments: titanium dioxide (C.I. Pigment White 6), zinc white, pigment-grade zinc oxide; zinc sulfide, lithopone;
black pigments: black iron oxide (C.I. Pigment Black 11), iron manganese black, spinel black (C.I. Pigment Black 27); carbon black (C.I. Pigment Black 7); graphite (C.I. Pigment Black 10); chromium iron oxide black (C.I. Pigment Brown 29);
chromatic pigments: chromium oxide, chromium oxide hydrate green; chromium green (CA. Pigment Green 48); cobalt green (C.I. Pigment Green 50); ultramarine green; cobalt blue (C.I. Pigment Blue 28 and 36; C.I. Pigment Blue 72); ultramarine blue; manganese blue; ultramarine violet; cobalt violet and manganese violet; red iron oxide (C.I. Pigment Red 101); cadmium sulfoselenide (C.I. Pigment Red 108); cerium sulfide (C.I. Pigment Red 265); molybdate red (C.I. Pigment Red 104);
ultramarine red; brown iron oxide (C.I. Pigment Brown 6 and 7), mixed brown, spinel phases and corundum phases (C.I. Pigment Brown 29, 31, 33, 34, 35, 37, 39, and 40), chromium titanium yellow (C.I. Pigment Brown 24), chromium orange; cerium sulfide (C.I. Pigment Orange 75); yellow iron oxide (C.I. Pigment Yellow 42); nickel titanium yellow (C.I. Pigment Yellow 53; C.I. Pigment Yellow 157, 158, 159, 160, 161, 162, 163, 164, and 189); spinel phases (C.I. Pigment Yellow 119); cadmium sulfide and cadmium zinc sulfide (C.I. Pigment Yellow 37 and 35); chromium yellow (C.I. Pigment Yellow 34); bismuth vanadate (CA. Pigment Yellow 184).

Examples of suitable fillers are inorganic pigments, such as transparent silicon dioxide, finely ground quartz, aluminum oxide, aluminum hydroxide, natural and synthetic micas, talc, kaolin, calcium carbonate, such as natural and precipitated chalk, and barium sulfate.

The luster pigments are platelet-shaped pigments which have a monophasic or polyphasic construction and a color play which is marked by the interplay of interference, reflection, and absorption phenomena. Examples include aluminum platelets, and aluminum, iron oxide, glass and mica platelets bearing one or more coating layers, in particular of metal oxides.

The amount of the pigment component (A) is 1 to 80 wt %, based on the total weight of the aqueous pigment preparation, preferably 5 to 70 wt %.

Where there is a combination of pigment and filler, the weight ratio of pigment to filler may be in the range from 1:20 to 20:1.

As component (B), the pigment preparations of the invention comprise at least one water-soluble, anionic, surface-active additive from the group of the homo- and copolymers of ethylenically unsaturated monocarboxylic acids and/or ethylenically unsaturated dicarboxylic acids, which may further comprise, in copolymerized form, vinyl monomers containing no acid function, and of the salts of these homo- and copolymers, the homo- and copolymers being at least partly esterified with a polyether alcohol or a derivative thereof.

Examples of the carboxyl-containing monomers and the vinyl monomers include the following:
acrylic acid, methacrylic acid, and crotonic acid;
maleic acid, maleic anhydride, maleic monoesters, maleic monoamides, reaction products of maleic acid with diamines which may have been oxidized to derivatives containing amine oxide groups, and fumaric acid, preference being given to maleic acid, maleic anhydride, and maleic monoamides;
vinylaromatics, such as styrene, methylstyrene, and vinyltoluene;
α-$C_2$-$C_{22}$-(1-alkenes), such as ethylene, propylene, isobutene, diisobutene, butadiene, 1-hexadecene, 1-octadecene, 1-eicosene, and 1-docosene;
vinyl ethers, such as polyalkylene glycol monovinyl ethers and alkyl or aryl derivatives thereof, e.g., polyethylene glycol monovinyl ether, polypropylene glycol monovinyl ether, polyethylene glycol methyl vinyl ether (mPEG vinyl ether) or polypropylene glycol methyl vinyl ether;
vinyl esters of linear or branched monocarboxylic acids, such as vinyl acetate and vinyl propionate;
alkyl esters and aryl esters of ethylenically unsaturated monocarboxylic acids, especially acrylic and methacrylic esters, such as methyl, ethyl, propyl, isopropyl, butyl, pentyl, hexyl, cyclohexyl, 2-ethylhexyl, nonyl, isobornyl, lauryl, and hydroxyethyl (meth)acrylate and also phenyl, naphthyl, and benzyl (meth)acrylate;
dialkyl esters of ethylenically unsaturated dicarboxylic acids, such as dimethyl, diethyl, dipropyl, diisopropyl, dibutyl, dipentyl, dihexyl, di-2-ethylhexyl, dinonyl, dilauryl, and di-2-hydroxyethyl maleate and fumarate;
vinylpyrrolidone;
acrylonitrile and methacrylonitrile.

Preferred vinyl monomers are styrene, vinyltoluene, isobutene, diisobutene, 1-hexadecene, 1-octadecene, 1-eicosene, $C_1$-$C_{22}$-alkyl esters (meth)acrylic acid, hydroxyethyl (meth)acrylate, benzyl (meth)acrylate, polyethylene glycol monovinyl ether, polyethylene glycol methyl vinyl ether, and combinations thereof.

Examples of preferred homopolymers of these monomers include, in particular, polyacrylic acids. The copolymers of the stated monomers may be constructed from two or more, more particularly three, different monomers. There may be random copolymers, alternating copolymers, block copolymers, and graft copolymers. Preferred copolymers include styrene/acrylic acid, acrylic acid/maleic acid, acrylic acid/methacrylic acid, butadiene/acrylic acid, isobutene/maleic acid, diisobutene/maleic acid, and styrene/maleic acid and polyethylene glycol monovinyl ether/maleic acid copolymers, each of which may contain, as further monomer constituents, acrylic esters, maleic esters and/or 1-alkenes, such as 1-hexadecene, 1-octadecene, or 1-eicosene.

The carboxyl groups of the nonalkoxylated homo- and copolymers are preferably present at least partly in salt form, in order to ensure solubility in water. Suitable are, for example, alkali metal salts, such as sodium and potassium salts, ammonium salts, and organic ammonium salts.

In accordance with the invention, the homo- and copolymers are at least partly esterified with polyether alcohols or derivatives thereof, preferably at least 30 mol %, more particularly 50 mol %. In general the degree of esterification of these polymers is 30 to 80 mol %.

Particularly suitable for the esterification are the polyether alcohols themselves, preferably polyethylene glycols and polypropylene glycols, and also their unilaterally endgroup-capped derivatives, especially the corresponding monoethers, such as monoaryl ethers, e.g., monophenyl ethers, and especially mono-$C_1$-$C_{26}$-alkyl ethers, examples being ethylene glycols and propylene glycols etherified with fatty alcohols, and the polyetheramines, which are preparable, for example, by conversion of a terminal OH group of the corresponding polyether alcohols or by polyaddition of alkylene oxides with preferably primary aliphatic amines. Preferred here are polyethylene glycols, polyethylene glycol monoethers, and polyetheramines. The average molecular weights $M_n$ of the polyether alcohols and their derivatives that are used are customarily 200 to 10 000 g/mol.

In one preferred embodiment, accordingly, the invention relates to a pigment preparation where the derivative of a polyether alcohol is a unilaterally capped monoether derivative or a monoamine derivative, more particularly a unilaterally capped monoether derivative.

By controlling the ratio of polar to apolar groups it is possible to tailor the surface-active properties of the additives (B).

The nonalkoxylated homo- and copolymers on which the polymeric additives (B) are based customarily have average molecular weights $M_w$ of 900 to 250 000 g/mol. The molecular weight ranges particularly suitable for the individual polymers are of course dependent on their composition. Molecular weight data are given below by way of example for various polymers:
polyacrylic acids: $M_w$ from 900 to 250 000; preferably 900 to 50 000;
styrene/acrylic acid copolymers: $M_w$ from 1000 to 50 000;
acrylic acid/methacrylic acid copolymers: $M_w$ from 1000 to 250 000; preferably 1000 to 100 000;
acrylic acid/maleic acid copolymers: $M_w$ from 2000 to 70 000.

The amount of component (B) is preferably 1 to 8 wt %, based on the total weight of the aqueous pigment preparation.

Component (C) of the pigment preparations of the invention is formed by additives based on lecithins and/or anionic additives based on phosphoric esters and/or phosphonic esters of polyalkylene oxides or of reaction products of alkylene oxides or aryl-substituted alkylene oxides, as for example phenyl-substituted ethylene oxide, with aliphatic alcohols, phenol or naphthol, each of which may also be substituted, with aliphatic or aromatic amines, aliphatic carboxylic acids or carboxamides, or the salts of these esters. Additives of these kinds are described for example in WO-A-2004/00903.

By reaction with phosphoric acid, phosphorus pentoxide or phosphonic acid, the alkoxylation products/polyether alcohol derivatives can be converted into the phosphoric monoesters and diesters or phosphonic esters, respectively. The anionic esters are preferably in the form of water-soluble salts, more particularly alkali metal salts, especially sodium salts, potassium salts, ammonium salts or organic ammonium salts. They may, however, also be used in the form of the free acids.

The polyether alcohol derivatives may be prepared by polyaddition of alkylene oxides with starter molecules, such as aliphatic or aromatic alcohols. It is usual to use 1 to 300 mol, preferably 3 to 150 mol, more particularly 3 to 50 mol of alkylene oxide per mole of starter molecule. The alcohols are reacted by known methods, with acidic or alkaline catalysis, for example.

Suitable aliphatic alcohols contain generally 6 to 26 C atoms, preferably 8 to 18 C atoms, and may be straight-chain or branched in construction, and may also be unsaturated.

Examples of saturated alcohols are hexyl alcohol, heptyl alcohol, octyl alcohol (caprylyl alcohol), nonyl alcohol, decyl alcohol, isodecyl alcohol, undecyl alcohol, dodecyl alcohol (lauryl alcohol), 2-butyloctyl alcohol, tridecyl alcohol, isotridecyl alcohol, tetradecyl alcohol (myristyl alcohol), pentadecyl alcohol, hexadecyl alcohol (cetyl alcohol), 2-hexyldecyl alcohol, heptadecyl alcohol, octadecyl alcohol (stearyl alcohol), nonadecyl alcohol, eicosyl alcohol, docosyl alcohol, hydrated tallow alcohol, and combinations thereof.

Particularly suitable are alcohols of natural origin, such as capryl alcohol, decyl alcohol, lauryl alcohol, myristyl alcohol, cetyl alcohol, stearyl alcohol, eicosyl alcohol, oeyl alcohol, linoleyl alcohol, linolenoyl alcohol, ricinol alcohol, and combinations thereof.

Also particularly suitable are the saturated or unsaturated fatty alcohols obtained by lipolysis and reduction from natural raw materials, examples being fatty alcohols from coconut oil or palm kernel oil, as for example cocoyl alcohol or palm kernel oil alcohol.

Also particularly suitable are the synthetic alcohols from the oxo process (also referred to as "oxo-process alcohols" or "oxo alcohols"). Oxo alcohols are linear and have no more than one branching point, examples being iso-$C_{13}$-oxo alcohols and $C_{13}$-$C_{15}$-oxo alcohols.

Suitable aromatic alcohols are phenol, 1-naphthol, and 2-naphthol, which may be substituted by $C_1$-$C_{12}$-alkyl, preferably $C_1$-$C_4$-alkyl or $C_4$-$C_{12}$-alkyl, or by styryl, which may be substituted by methyl.

The polyether alcohol derivatives comprise unmixed polyalkylene oxides, preferably $C_2$-$C_4$-alkylene oxides and phenyl-substituted $C_2$-$C_4$-alkylene oxides, more particularly polyethylene oxide (EO), polypropylene oxide, and poly(phenylethylene oxide), block copolymers such as ethylene oxide/propylene oxide block copolymers and ethylene oxide/phenylethylene oxide block copolymers, or random copolymers of these alkylene oxides.

Suitable phosphoric and phosphonic esters are derived in particular from alkoxylated, more particularly ethoxylated, fatty alcohols, oxo alcohols, or substituted phenols.

Preferred are phosphoric esters of alkoxylated fatty alcohols, oxo alcohols, or phenols, such as phosphoric esters of the formula $$[RO\text{---}(C_2\text{-}C_3\text{-alkylene oxide})_y]_x\text{-}PO(OH)_{3-x} \qquad (I)$$

in which
the radical R independently at each occurrence is linear or branched $C_8$-$C_{22}$-alkyl, $C_8$-$C_{22}$-alkenyl or phenyl which may be substituted one or more times by $C_1$-$C_{12}$-alkyl, styryl or methyl-substituted styryl,
the ($C_2$-$C_3$-alkylene oxide) group is ethylene oxide and/or propylene oxide,
x=1 or 2, and
y=1-100.

The ($C_2$-$C_3$-alkylene oxide) group is constructed preferably of —($CH_2$—$CH_2O$)— and/or —($CH_2$—$CH(CH_3)O$)—. In the case of mixed alkylene oxide units —($CH_2$—$CH_2O)_m$—($CH_2$—$CH(CH_3)O)_n$—, when m≥1 and n≥1, more particularly m≥3 and n≥3, these may be of random or blockwise construction.

The group ($C_2$-$C_3$-alkylene oxide)$_y$ is preferably —($CH_2$—$CH_2O)_m$—($CH_2$—$CH(CH_3)O)_n$— in which m=0-50; and n=0-50;
with the proviso that m+n is at least 1, more particularly at least 3.

The group ($C_2$-$C_3$-alkylene oxide)$_y$ is more particularly —($CH_2$—$CH_2O)_m$—($CH_2$—$CH(CH_3)O)_n$— in which m=3-20; and n=3-20;
with the proviso that m+n is at least 3.

Particularly preferred are phosphoric esters of the formula

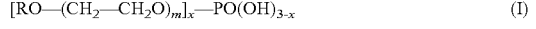

$$[RO\text{—}(CH_2\text{—}CH_2O)_m]_x\text{—}PO(OH)_{3-x} \quad (I)$$

in which m=3-20 and x=1 or 2.

Further preferred are phosphoric esters of the formula (I) in which the group ($C_2$-$C_3$-alkylene oxide)$_y$ is a polyethylene oxide having 3 to 20, more particularly 5 to 20, units.

Further preferred are phosphoric esters of the formula (I) in which the group ($C_2$-$C_3$-alkylene oxide)$_y$ comprises an ethylene oxide/propylene oxide block copolymer having in each case at least one ethylene oxide block of 3 to 20 units and at least one propylene oxide block of 3 to 20 units.

Further preferred are phosphoric esters of the formula (I) in which the group ($C_2$-$C_3$-alkylene oxide)$_y$ is a random copolymer of 3 to 20 ethylene oxide units and of 3 to 20 propylene oxide units.

Particularly preferred are phosphoric esters of the formula

$$[RO\text{—}(C_2\text{-}C_3\text{-alkylene oxide})_y]_x\text{-}PO(OH)_{3-x} \quad (I)$$

in which
the radical R independently at each occurrence is $C_8$-$C_{22}$-alkyl, $C_8$-$C_{22}$-alkenyl, distyrylphenyl, tristyrylphenyl, dibutylphenyl or tributylphenyl.

Anionic surface-active additives of these kinds are known and are available commercially for example under the names Crodafos® (Croda), Rhodafac® (Rhodia), Maphos® (BASF), Dispex® (BASF), Empicol® (Albright & Wilson), Matexil® (101), Soprophor® (Rhodia) and Lutensit® (BASF), Strodex (Dexter), Hostphat® (Clariant).

In one preferred embodiment, accordingly, the present invention relates to a pigment preparation where component (C) is a phosphoric ester of the formula $$[RO\text{—}(C_2\text{-}C_3\text{-alkylene oxide})_y]_x\text{-}PO(OH)_{3-x} \quad (I)$$

in which
the radical R independently of each occurrence is linear or branched $C_8$-$C_{22}$-alkyl, $C_8$-$C_{22}$-alkenyl or phenyl, which may be substituted one or more times by $C_1$-$C_{12}$-alkyl, styryl or methyl-substituted styryl,
the ($C_2$-$C_3$-alkylene oxide) group is ethylene oxide and/or propylene oxide,
x=1 or 2, and
y=1-100.

Especially preferred is a pigment preparation where component (C) is a phosphoric ester of the formula

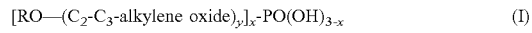

$$[RO\text{—}(C_2\text{-}C_3\text{-alkylene oxide})_y]_x\text{-}PO(OH)_{3-x} \quad (I)$$

in which
the radical R independently of each occurrence is $C_8$-$C_{22}$-alkyl, $C_8$-$C_{22}$-alkenyl, distyrylphenyl, tristyrylphenyl, dibutylphenyl or tributylphenyl,
the ($C_2$-$C_3$-alkylene oxide) group is ethylene oxide and/or propylene oxide,
x=1 or 2, and
y=3-50.

With particular preference, furthermore, lecithins are part of component (C). Lecithins are phospholipids which are composed of fatty acids, glycerol, phosphoric acid, and choline. In this case the fatty acids may be saturated or unsaturated. The lecithins are generally in amphoteric form. Component (C) more preferably comprises lecithin or soylecithin.

Preferred accordingly is a pigment preparation where component (C) comprises lecithins.

As component (C) it is possible likewise to use combinations of lecithins and anionic phosphoric and phosphonic esters, more particularly phosphoric esters of the formula (I).

The amount of component (C) is preferably 0.5 to 8 wt %, based on the total weight of the aqueous pigment preparation.

The optional component (D) is formed from various additives which are used customarily in aqueous pigment preparations for inks, paints, and renders. These additives may comprise, for example, humectants, rheological additives like thickeners, further dispersants, for example nonionic additives based on polyethers, and defoamers, foam suppressants, stabilizers like biocides or fungizides, antiflocculants, and pigment synergists. Additives of this kind are known for aqueous pigment preparations to the skilled person.

In one preferred embodiment, the invention relates to a pigment preparation where component (D) comprises 0 to 20 wt %, more particularly 0.1 to 20 wt %, of further additives customary to the production of aqueous pigment preparations, selected from humectants, rheological additives, dispersants other than (B) and (C), defoamers, foam suppressants, biocides or fungicides, antiflocculants, buffer substances, pH regulators, and pigment synergists.

Suitable humectants (component D1) are, for example, water-soluble polyethylene glycols, polyglycerols, glycerol alkoxylates, and alkoxylation products prepared by addition reaction of ethylene oxide(s) and/or propylene oxide(s) with polyhydric alcohols.

Suitable water-soluble polyethylene glycols are those having molecular weights of about 300 g/mol, 400 g/mol, 600 g/mol or the like, or polypropylene glycols having molecular weights of about 300 g/mol, 400 g/mol, 600 g/mol or the like.

Examples of polyglycerols are di-, tri- and tetraglycerols or combinations thereof.

Glycerol alkoxylates may for example be glycerol ethoxylates having a molecular weight of about 200 to about 1000 g/mol.

Alkoxylation products prepared by addition reaction of ethylene oxide(s) and/or propylene oxide(s) with polyhydric alcohols may be, for example, trimethylol alkoxylates or pentaerythritol alkoxylates having a molecular weight of about 200 to about 1000 g/mol.

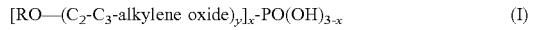

The humectants are added generally in an amount of 0.01 to 15 wt %, preferably 3 to 12 wt %, based on the total weight of the pigment preparation.

Figures for molecular weight of the polymers are based fundamentally on their number-average molecular weight. Molecular weights are to be determined by GPC against polyethylene glycol as standard.

Dispersants (component D2) are preferably nonionic dispersants based on polyethers, as described for example in WO-A-2004/046251 as component (C). The polyethers more particularly are polyalkylene oxides or reaction products of alkylene oxides or aryl-substituted alkylene oxides, especially phenyl-substituted ethylene oxides, with alcohols, amines, aliphatic carboxylic acids or aliphatic carboxamides. Alkylene oxide adducts of this kind may be formed, for example, with monofunctional amines and alcohols, but also with amines and alcohols having a functionality of at least two. Additives which may be used as component (D2) are known commercially, for example, under the Tetronic®, Rhodoline® or Lutensol® designation.

Preference is given to using ethylene oxide/propylene oxide block copolymers, fatty alcohol ethoxylates, and fatty alcohol-ethylene oxide/propylene oxide adducts as further dispersants.

The amount of nonionic dispersant (D2) is preferably up to 5 wt %, based on the total weight of the aqueous pigment preparation.

As further dispersants it is also possible for water-soluble, anionic, surface-active additives (D3) from the group of the homo- and copolymers of ethylenically unsaturated monocarboxylic acids and/or ethylenically unsaturated dicarboxylic acids, which further comprise, in copolymerized form, vinylmonomers containing no acid function, and of the salts of these homo- and copolymers to be included.

Examples of the carboxyl-containing monomers and the vinylmonomers are the above monomers which form component (B).

Preferred copolymers include styrene/acrylic acid, acrylic acid/maleic acid, acrylic acid/methacrylic acid, butadiene/acrylic acid, isobutene/maleic acid, diisobutene/maleic acid, styrene/maleic acid, and polyethylene glycol monovinyl ether/maleic acid copolymers, each of which may comprise, as additional monomer constituents, acrylic esters, maleic esters and/or 1-alkenes such as 1-hexadecene, 1-octadecene, or 1-eicosene.

Component (D3) may also be used alternatively as component (B) in the pigment preparation of the invention, in an amount of 0.01 to 10 wt %, based on the total weight of the preparation.

Defoamers may be included in the preparation in small amounts (0.01 to 0.2 wt %, based on the total weight of the pigment preparation, from the companies Tego, Byk, and Borchers, for example). Suitable defoamers are preferably mineral oil defoamers, polyether-modified polysiloxanes, silicones, polysiloxanes, vegetable oils, polymer-based defoamers such as modified fatty acids, polyethers, polyacrylates, silicon oils, or modified amides. Foam suppressants as well, known for example commercially under the Degressal® name, may be included in an amount up to about 5 wt %, based on the total weight of the pigment preparation.

The pigment preparations may further comprise biocides, including fungicides, in small amounts (0.01 to 0.5 wt %, based on the total weight of the pigment preparation), from the companies Thor, and Rohm & Haas, for example.

Rheological additives may be added in an amount of about 0.01 to 2 wt %, based on the total weight of the pigment preparation. Preference is given to adding thickeners, such as organophyllosilicates, cellulose derivatives, polyurethane thickeners, hydrated castor oil, polyamides, sulfonates, or silica.

Pigment synergists may likewise be present in the pigment preparation, examples being compounds which comprise a pigment chromophore wholly or partly in their molecular structure and preferably have acidic or basic groups, as for example those disclosed in WO-A-2010/057864. The structure of the pigment synergist need not be the same as the structure of the pigment employed. Where a pigment synergist is present, the amount may be in the range from 0.01 to 5 wt %, preferably 0.1 to 3 wt %, based on the total weight of the pigment preparation.

The pigment preparations present are preferably substantially free from surface-active agents based on alkylphenol ethoxylates. These surface-active agents are commonly prepared from reaction products of branched nonylphenol or octylphenol with ethylene oxide. The term "substantially free from alkylphenol ethoxylates" means that the amount of alkylphenol ethoxylates is less than about 0.1 wt %, based on the total weight of the pigment preparation. With further preference the pigment preparations are free from alkylphenol ethoxylates.

The pigment preparation of the invention is preferably in the form of a paste. It is further preferred for the pigment composition of the invention to be fluid and pumpable. The present pigment preparation preferably has a viscosity of less than 3000 mPa·s, measured using a cone/plate rheometer (e.g., Rheo Stress RS 600, from Thermo) at a shear rate of 20 $sec^{-1}$.

The amount of water in the present pigment preparation may be up to 60 wt %, more particularly from 10 to 50 wt %.

Subject matter of the present invention, furthermore, is a method for producing the present pigment preparation, where first of all components (A) to (C) and at least part of component (D) are introduced into water, the resulting suspension is subjected to wet comminution, and optionally the remaining amount of component (D) is subsequently added to the suspension.

With preference, in succession, the components (B), (C), and at least part of the additives (D), such as defoamers and biocides, are introduced into water and subsequently the pigment component (A) is added.

In the method, component (A) may be used in the form of dry powder or as a presscake. With preference an aftertreated product is used, meaning that the primary particle size of the pigment component has already been set to the value desired for the application. This aftertreatment is advisable especially in the case of organic pigments, since the as-synthesized crude pigment is generally not suitable directly for the application. In the case of inorganic pigments, as with oxide pigments and bismuth vanadate pigments, for example, the primary particle size may also be set during pigment synthesis, and so the pigment suspensions obtained can be used directly in the method of the invention.

Since the aftertreated pigment component (A) frequently undergoes reagglomeration again in the course of drying and/or on the filter assembly, it is subjected to wet comminution, such as to grinding in a stirred ball mill, for example, in aqueous suspension.

The wet comminution ought to be carried out with at least some of the additive (D) comprised in the completed pigment preparation; it is preferable to add defoamers, fractions of biocides, and nonionic dispersants prior to wet comminution. Remaining additives (D) such as biocides, fungicides, pigment synergists, humectants, antiflocculants or rheological additives may also be added only after the grinding.

Thickeners may be added in during wet grinding, and also after the grinding, in order to set the viscosity desired for the pigment preparation.

A further subject of the present invention is the use of the pigment preparation as mentioned above for coloring paints, inks, and renders, preferably in metering systems and tinting apparatus at the point of sale, or in in-plant tinting systems.

The pigment preparations of the invention are notable for outstanding performance properties, in particular for high color strength and ready dispersibility in application media of different kinds. They are suitable especially as universal pigment preparations, meaning that they are compatible both with aqueous emulsion paints and with solventborne paints. The resulting solventborne paints and emulsion paints do not show any color change in the rubout test as described in DE-A-2202527.

The preparations are low in VOC and in SVOC and meet all of the requirements of customary eco labels.

Furthermore, in the tinting of the emulsion paints and solventborne paints, they exhibit high accuracy in metering, even at very small amounts of 0.1 ml, and also directly after introduction into the metering-system containers, allowing the usual waiting time of around one day to be done away with.

The pigment preparations are stable and do not dry on the inner walls of the containers or in the metering system, such as in open nozzles, for example, thereby ensuring consistent coloristic performance.

EXAMPLES

Production of the Pigment Preparation

A suspension of pigment component (A), additives (B), (C), and (D) in water (in the case of pH levels <7, adjusted to a pH of 7-9 by addition of aqueous sodium hydroxide solution (25 wt % strength solution)) was ground in a ball mill to a $d_{50}$ of <1 μm. The pigment preparations contain ingredients as below, based in each case on the total weight of the preparation.

Ingredients of the Exemplary Pigment Preparations

In the examples, the amount of component (B) and (C) is based on each of the components used, in the form of solutions.

Component A
  Bayferrox® 943 (C.I. Pigment Yellow 42)
  Bayferrox® 130 (C.I. Pigment Red 101)
  Furnace black (C.I. Pigment Black 7)
  Filler: talc
Component B
B-1 aqueous solution of a copolymer of 50 wt % maleic anhydride and 50 wt % isobutene, reacted with ethoxylated Cu/Cu fatty alcohol (7 EO/mol alcohol) (solids content: 45%; pH: 7.5; $M_w$ 3000)
B-2 aqueous solution of a polymethacrylic acid reacted with polyethylene glycol ($M_n$ 1000) (solids content: 40%; pH: 7; $M_w$ 20 000)
B-3 aqueous solution of a copolymer of 50 wt % styrene and 50 wt % maleic anhydride, reacted with polyethylene glycol ($M_n$ 500) (solids content: 43%; pH: 8; $M_w$ 10 000)
Component C
C-1: potassium salt of a phosphoric ester based on an ethoxylated Cu/Cu fatty alcohol (12 EO) (25 wt % aqueous solution)
C-2: potassium salt of a phosphoric ester based on an ethoxylated tristyrylphenol (16 EO) (25 wt % aqueous solution)
Lecithin Example 1

| | |
|---|---|
| 55 wt % | Bayferrox 943 |
| 5 wt % | B-1 |
| 4 wt % | C-1 |
| 3 wt % | Lecithin |
| 1 wt % | foam suppressant |
| 10 wt % | PEG 400 |
| 0.4 wt % | biocide |
| 0.5 wt % | defoamer |
| remainder | water |

Example 2

| | |
|---|---|
| 55 wt % | Bayferrox 943 |
| 5 wt % | B-3 |
| 4 wt % | C-1 |
| 3 wt % | Lecithin |
| 1 wt % | foam suppressant |
| 10 wt % | PEG 400 |
| 0.4 wt % | biocide |
| 0.5 wt % | defoamer |
| remainder | water |

Example 3

| | |
|---|---|
| 55 wt % | Bayferrox 943 |
| 5 wt % | B-2 |
| 4 wt % | C-1 |
| 3 wt % | Lecithin |
| 1 wt % | foam suppressant |
| 10 wt % | PEG 400 |
| 0.4 wt % | biocide |
| 0.5 wt % | defoamer |
| remainder | water |

Examples 1a to 3a

The compositions of examples 1a to 3a correspond to those of examples 1 to 3 apart from the fact that they contain no lecithin.

Examples 1 b to 3b

The compositions of examples 1 b to 3b correspond to those of examples 1 to 3 apart from the fact that they contain the same amount of C-2 instead of C-1.

Examples 1c to 3c

The compositions of examples 1c to 3c correspond to those of examples 1 b to 3b apart from the fact that they contain no lecithin.

Examples 1d to 3d

The compositions of examples 1d to 3d correspond to those of examples 1 to 3 apart from the fact that they contain 60 wt % Bayferrox 130 instead of 55 wt % Bayferrox 943.

Examples 1e to 3e

The compositions of examples 1e to 3e correspond to those of examples 1a to 3a apart from the fact that they contain 60 wt % Bayferrox 130 instead of 55 wt % Bayferrox 943.

Examples 1f to 3f

The compositions of examples 1f to 3f correspond to those of examples 1b to 3b apart from the fact that they contain 60 wt % Bayferrox 130 instead of 55 wt % Bayferrox 943.

Examples 1g to 3g

The compositions of examples 1g to 3g correspond to those of examples 1c to 3c apart from the fact that they contain 60 wt % Bayferrox 130 instead of 55 wt % Bayferrox 943.

Example 6

| | |
|---|---|
| 8 wt % | Furnace black |
| 30 wt % | talc |
| 12 wt % | B-1 |
| 12 wt % | C-1 |
| 3 wt % | Lecithin |
| 1 wt % | foam suppressant |
| 10 wt % | PEG 400 |
| 0.4 wt % | biocide |
| 0.5 wt % | defoamer |
| remainder | water |

Example 7

| | |
|---|---|
| 8 wt % | Furnace black |
| 30 wt % | talc |
| 12 wt % | B-1 |
| 12 wt % | C-2 |
| 3 wt % | Lecithin |
| 1 wt % | foam suppressant |
| 10 wt % | PEG 400 |
| 0.4 wt % | biocide |
| 0.5 wt % | defoamer |
| remainder | water |

Application Systems:
(1) Waterborne emulsion paint based on styrene/acrylate, with a white pigment content of 16.4 wt % ($TiO_2$, Kronos 2043) (test binder 00-1067, BASF)
(2) Aromatics-free, air-drying white alkyd gloss paint (60-69 wt % solids fraction), aliphatic solvents (Rubbol; Akzo Nobel)
(3) low-VOC/SVOC emulsion paint based on Acronal DS 6282X (pigment volume concentration 41%)

The pigment preparations of examples 1 to 7 were added to the application systems (1) and (2) in a dispenser (Corob D410):

Dispenser: Corob D410, minimum metering quantity of 0.1 ml; pump accuracy 0.01 ml.

Test 1: Calibration of the 0.1 ml Metering Directly after Introduction

Even after direct metering of 0.1 ml after introduction, deviations only of 10% at most were found by measurement. This figure is frequently not achieved until after a waiting time of 1 day.

Test 2: Reproducibility

Even after 8 weeks, the accuracy of the 0.1 ml metering remained <10%. Under the storage conditions of the dispenser and in the containers, the paste remained unchanged. No change was observed in the rheology, and no sedimentation of the pigment component; the coloristic properties remained unchanged (change in color strength after 8 weeks $\Delta E<0.5$).

The color strength of the pigment preparations was determined by colorimetry as a white reduction (Datacolor SF600; standard illuminant D65). For this purpose, a mixture of 2.5 of each of examples 1 to 7 and 50 g of application system 1 was homogenized in a plastic beaker, using a high-speed stirrer at 1500 rpm, for 3 minutes. The paint obtained was then drawn down using a 100 μm coil blade onto black/white test cardboard, and dried for 30 min.

Test 3: Conditioning of the Dispenser as a Whole at 35° C.

The metering properties were retained.

Test 4: Drying of the Pigment Preparations in the Nozzles

Recordings of the nozzles made with a video camera during the metering operations showed no significant drying of the pigment preparations on and in the nozzles even after 8 weeks (metering 1×/week). No hanging drops were observed either.

Test 5: VOC/SVOC Measurement 10 wt % of the pigment preparations of examples 1-7 (based on the total weight of the pigment preparation and application system) were added to the application system (3). The VOC and SVOC contents were determined by chamber emission method according to DIN EN ISO 16000. Measurements were made of the VOC and SVOC values after 3 and after 28 days, with the following requirements concerning the air:

VOC<10 mg/m³ after 3 days and <1 mg/m³ after 28 days
SVOC<0.1 mg/m³ after 28 days All of the examples met the requirements.

Test 6: Rubout Test

The rubout test in accordance with DE-A-2202527 was carried out for examples 1 to 7, in each case in all application systems. In no case was any change in shade observed.

The invention claimed is:

1. A pigment preparation comprising, based in each case on the total weight of the preparation,
   (A) 1 to 80 wt % of a pigment component which comprises a pigment and optionally a filler;
   (B) 0.01 to 10 wt % of a water-soluble, anionic, surface-active additive selected from the group consisting of homo- and copolymers of ethylenically unsaturated monocarboxylic acids and/or ethylenically unsaturated dicarboxylic acids, which may further comprise, in copolymerized form, vinyl monomers comprising no acid function, and of the salts of the homo- and copolymers, the homo- and copolymers being at least partly esterified with a polyether alcohol or a derivative thereof;
   (C) 0.01 to 8 wt % of a phosphoric ester of the formula (I):

$$[RO-(C_2-C_3\text{-alkylene oxide})_y]_x-PO(OH)_{3-x} \qquad (I)$$

wherein
the radical R independently at each occurrence is linear or branched $C_8$-$C_{22}$-alkyl, $C_8$-$C_{22}$-alkenyl or phenyl which may be substituted by $C_1$-$C_{12}$-alkyl, styryl or methyl-substituted styryl,
the ($C_2$-$C_3$-alkylene oxide) group is ethylene oxide and/or propylene oxide,
x=1 or 2, and
y=1-100;
(D) 0 to 20 wt % of one or more further additives customary for aqueous pigment preparations; and
(E) water,
where the sum of the percentages by weight of components (A) to (E) makes 100 wt %.

2. The pigment preparation according to claim 1, where the derivative of a polyether alcohol is a unilaterally capped monoether derivative or a monoamine derivative.

3. The pigment preparation according to claim 1, wherein
the radical R independently at each occurrence is $C_8$-$C_{22}$-alkyl, $C_8$-$C_{22}$-alkenyl, distyrylphenyl, tristyrylphenyl, dibutylphenyl or tributylphenyl,
the ($C_2$-$C_3$-alkylene oxide) group is ethylene oxide and/or propylene oxide,
x=1 or 2, and
y=3-50.

4. The pigment preparation according to claim 1, wherein component (C) further comprises one or more lecithins.

5. The pigment preparation according to claim 1, where component (D) comprises 0.01 to 15 wt % of a humectant (D1).

6. The pigment preparation according to claim 1, where component (D) comprises 0.01 to 5 wt % of a nonionic dispersant (D2) based on one or more polyethers.

7. The pigment preparation according to claim 1, where component (D) comprises 0.01 to 2 wt % of a thickener.

8. The pigment preparation according to claim 1, where a VOC content is less than 1000 ppm.

9. The pigment preparation according to claim 1, where a SVOC content is less than 5000 ppm.

10. The pigment preparation according to claim 1, in the form of a paste.

11. The pigment preparation according to claim 1, being substantially free from alkylphenol ethoxylates.

12. The pigment preparation according to claim 5, where the humectant (D1) is a polyethylene glycol.

13. A method for producing the pigment preparation according to claim 1, where components (A) to (C) and at least part of component (D) are introduced into water, the resulting suspension is subjected to wet comminution, and optionally the remaining amount of component (D) is subsequently added to the suspension.

14. A coloring paint, an ink, or a render, comprising the pigment preparation according to claim 1.

* * * * *